United States Patent [19]

Armbruster et al.

[11] Patent Number: 5,089,540
[45] Date of Patent: Feb. 18, 1992

[54] PROCESSES AND COMPOSITIONS TO ENHANCE THE TENSILE STRENGTH OF RECLAIMED SAND BONDED WITH ALKALINE RESINS

[75] Inventors: David R. Armbruster, Forest Park; S. Raja Iyer, Naperville; Merlyn C. Pasion, Carol Stream, all of Ill.

[73] Assignee: Borden, Inc., Columbus, Ohio

[21] Appl. No.: 596,546

[22] Filed: Oct. 12, 1990

Related U.S. Application Data

[63] Continuation-in-part of Ser. No. 538,588, Jun. 15, 1990, which is a continuation of Ser. No. 179,392, Apr. 8, 1988, abandoned.

[51] Int. Cl.$^5$ .......................... C08K 9/06; C08K 3/36
[52] U.S. Cl. .................................. 523/213; 523/145; 524/188; 106/490
[58] Field of Search ................ 523/145, 213; 524/188; 106/490

[56] References Cited

U.S. PATENT DOCUMENTS

| | | | |
|---|---|---|---|
| 3,635,743 | 1/1972 | Smith | 106/490 |
| 3,847,848 | 11/1974 | Beers et al. | 523/213 |
| 4,118,540 | 10/1978 | Amort et al. | 428/447 |
| 4,468,359 | 8/1984 | Lemon et al. | 523/145 |
| 4,474,904 | 10/1984 | Lemon et al. | 523/146 |
| 4,780,489 | 10/1988 | Dunnavant et al. | 523/145 |
| 4,789,693 | 12/1988 | Jhaveri et al. | 523/145 |

FOREIGN PATENT DOCUMENTS 823269  9/1969  Canada .
882058  6/1967  Fed. Rep. of Germany .
1190644  5/1970  United Kingdom .

OTHER PUBLICATIONS

Iyer et al., "Reclamation of Phenolic Ester Cured No Bake Sands", in American Foundry Society Transactions (1989).
Union Carbide Bulletin, "Union Carbide Silanes as Additives for Foundry Resins", (Apr. 1968) pp. 1-5.
Stevenson and Railton, "Alphaset Sand Reclamation".
S.C.R.A.T.A. Article, "Experience of Reclaiming Alphaset Bonded Sand", (1985).
Kline, "Silane Coupling Agents as Integral Blends in Resin Filler System", Plastics (Jul. 1963) pp. 125-177.

*Primary Examiner*—Kriellion S. Morgan
*Assistant Examiner*—Yong S. Lee
*Attorney, Agent, or Firm*—Venable, Baetjer, Howard & Civiletti

[57] ABSTRACT

The present invention provides methods for treating reclaimed sand obtained from dismantled foundry molds and cores which contain residue from a cured binder of an ester-cured alkaline phenolic resin. Treatment of the reclaimed sand with a silane solution containing one or more amines, particularly an aqueous solution containing a silane and one or more amines, enhances the tensile strengths of foundry molds and cores produced therefrom relative to those obtained with untreated reclaimed sand. Methods for producing foundry cores and molds which incorporate such a treatment process are also provided by this invention, as are raw batch formulations.

39 Claims, No Drawings

PROCESSES AND COMPOSITIONS TO ENHANCE THE TENSILE STRENGTH OF RECLAIMED SAND BONDED WITH ALKALINE RESINS

The present application is a continuation-in-part of copending application, Ser. No. 07/538588, filed June 15, 1990, now pending, which is a continuation of copending application, Ser. No. 07/179392, filed on Apr. 8, 1988, now abandoned.

FIELD OF THE INVENTION

This invention relates to the manufacture of foundry molds and cores with alkaline resin binders and reclaimed sand. More particularly, this invention relates to methods for treating the reclaimed sand so as to improve the tensile strength of articles produced from the reclaimed sand and an ester curable alkaline phenolic resin binder; and to compositions useful for treating sand for that purpose.

RELATED APPLICATION

The present application is also closely related to copending application, Ser. No. 179,391, filed Apr. 8, 1988, now abandoned. All three of these applications are concerned with the effective reuse of reclaimed foundry sand. Each of the other applications cited above is expressly incorporated herein by reference.

BACKGROUND OF THE INVENTION

In the manufacture of foundry molds and cores from sand which is bonded with a curable binder, reclaiming the sand for reuse is an important economic consideration. Foundry sand can normally be used, then reused, repeatedly, when most resin binders are used. Normally there is a small loss of sand on reuse, and this loss is made up by adding pristine sand to the used reclaimed sand. These conditions are experienced with many common resin binders.

In recent years, alkaline phenolic resins have gone into widespread use. These resins can be ester-curable at ambient temperature. Such resin binder systems are disclosed, for example, in U.S. Pat. Nos.: 4,426,467, in which lactones are used as the curing agents; 4,474,904, in which carboxylic acid esters are so used; and 4,468,359, in which the esters are in the gaseous or vapor phase. These patents are expressly incorporated herein by reference.

While these binding systems offer many advantages, there are offsetting disadvantages that are sometimes observed. For example, when reclaimed sand is reused, the tensile strength of the molds or cores drops off. This may have a serious effect on the economics of the foundry.

The extent to which previously used sand is able to be reused is often determined by the tensile properties that can be achieved. One factor which determines the tensile strength is the ability of the binder to bond to the surfaces of the reclaimed sand. Higher rebinding strengths allow higher usage levels of reclaimed sand.

To reclaim sand from a foundry mold or core, the casting is first removed and the used mold or core shaken, vibrated or dismantled mechanically, to loosen the sand and break up any lumps or agglomerates. This sand is then further processed by one of three generally recognized treatment methods for processing reclaimed sand: mechanical; wet; and thermal.

Mechanical treatment processes typically involve subjecting the used sand to grinding, scrubbing or other mechanical attrition to free up the individual grains of sand, removing binder residues, providing clean sand surfaces and removing fines. Wet treatment processes involve washing the sand with water; draining; and drying the washed sand to the moisture levels necessary for subsequent use. Thermal treatment processes involve heating the sand to a temperature of about 1200° F. or above, so that the binder residue is decomposed or burned.

One common objective of these treatment processes is to remove binder residues. The binder residue level may be determined by a loss-on-ignition (L.O.I.) test. Loss-on-ignition is typically determined by heating $10 \pm 1$ grams of a sample for about two hours at 1700° F. and measuring residue level. New sand has an L.O.I. of less than about 0.1% to 0.3%, while untreated used sand has an L.O.I. of about 0.5% to 3%.

Where the reclaimed sand is recovered from foundry molds or cores in which the binder was an ester-cured alkaline phenolic resin, wet treatment processes have been found to be very effective. Wet treatment processes can produce sand which exhibits high bonding strength substantially equivalent to that of pristine sand. In contrast, the thermal and mechanical treatment processes do not produce reclaimed sand with such high bonding strength. It is believed that wet treatment processes "cleanse" the surfaces of the reclaimed sand of any harmful residues. While it is not well understood why ester curable alkaline phenolics do not bond well to the surfaces of further mechanically or thermally reclaimed sand previously bonded with ester cured alkaline phenolic binder, some theories have evolved based on apparent facts.

One such fact is that ester curable alkaline phenolic resins do not bond very well to a film, or a residue on a surface, of ester cured alkaline phenolic resin.

Mechanical and thermal treatment processes apparently are not as effective in removing harmful residues as wet treatment processes. Nonetheless, mechanical treatment processes are the most commonly employed by the foundry industry because they are the most economical. Thermal treatment processes are relatively undesirable because of their high energy costs, and wet treatment processes because of disposal problems associated with the wash water and energy costs for drying the sand.

Because of limitations in the mechanical and thermal treatment processes, reclaimed sands so treated, particularly those recovered from foundry molds or cores wherein the cured binder was an ester-cured alkaline phenolic resin, have bonding properties inferior to those of pristine sand. These inferior bonding properties limit the usage level of reclaimed sand in many cases to about 50 weight percent of the total sand when forming foundry cores and molds. Reclaimed sand levels of up to 90 weight percent are needed to achieve the desired economics and minimize disposal costs.

In comparison, the used, reclaimed sand obtained from foundry molds and cores which employ an acid-cured binder, such as acid-cured phenolic resin or furan resins, do not suffer significant losses in bonding strength after thermal or mechanical treatment. However, wet treatment processes are generally not effective in reclaiming such used sand. It is, of course, economically optimal for foundries to be able to reuse as much sand as possible, only buying new sand to make up for relatively minor handling losses. When this is done, foundries can often use as much as 80% to 90% reclaimed sand mixed with 10% to 20% new or pristine sand. However, if the bonding strength of a reclaimed sand is compromised, more than 10% to 20% new sand may have to be mixed with the reclaimed sand in order to increase bonding strength to an acceptable level.

It is desirable to enhance the bonding ability of used sand reclaimed from foundry molds and cores made with ester-cured alkaline phenolic resins, to the extent that usage levels of such used reclaimed sand as high as 80% to 90% by weight can be achieved.

It is known in the art to improve adhesion between polymeric binders and fillers such as sand by using a silane. In U.S. Pat. No. 3,487,043, a composition comprising a furan resin, an acid catalyst, a silane and an insoluble filler material may be polymerized in situ to provide a reinforced resin. The filler may be, for example, fiberglass, titania, ceramic fibers or powders, carbon black, silica, alumina, silica flour, asbestos, clays, or the like. A silane may be applied directly to the filler-reinforcing material, col. 3, lines 55-58. The reinforced or filled resin is used to make pipes, tanks, and other such objects. There is no suggestion of usefulness in the foundry industry.

The treatment of polymer-reinforcing inorganic fillers (glass mats) with a silane solution has been disclosed in U.S. Pat. No. 4,118,540 and UK Patent Specification 882058. In such treatment processes, the filler is immersed in a silane solution, then dried. The silane is believed to improve the affinity or receptivity of the glass mat for the polymer. There is no suggestion of using such a treatment in a foundry application, and the drying step consumes energy.

A number of binder systems are known for use in the foundry industry. J. Robins and others have received several patents relating to the use of isocyanate binder systems in the foundry industry. In one such patent, U.S. Pat. No. 3,403,721, there is a disclosure of precoating the sand with a silane, col. 4, lines 32-39, but, as that patent points out, precoating in this system offers no advantage over adding the silane at some other point.

The addition of silane to resin binder solutions to increase bonding strength is also known. Methods and compositions wherein a silane is added to the resin solution have been disclosed in the two patents just discussed and also in U.S. Pat. Nos. 4,256,623, 4,111,253 and 3,234,259, and UK Patent Specification 876,033.

The addition of a silane solution so as to improve the tensile strength of articles produced from reclaimed sand and an ester-curable alkaline phenolic resin binder is the subject of parent U.S. Pat. application Ser. No. 179,392, filed Apr. 8, 1988, now abandoned, of S.R. Iyer, of which the present application is a continuation-in-part. Iyer observed the decrease in tensile strength that occurred when an ester curable alkali phenolic resin was used as the binder for reclaimed sand that had been mechanically recovered from a shape that had been formed from sand bonded by an ester cured alkali phenolic resin binder, as compared to the tensile strength observed when 100% pristine sand was used.

Following this observation, and realizing its potential effect on the foundry industry, Iyer discovered the ability of mechanically reclaimed sand to form bonded articles of satisfactory tensile strength after treatment of the reclaimed sand with a silane solution. This treatment is generally useful for used sand that has been recovered and subjected to a mechanical or thermal reclamation treatment. It is also useful, but generally is not needed, for a used sand that has been subjected to a wet reclamation treatment.

The Iyer discovery provides a method for treating mechanically and/or thermally reclaimed foundry sand, that had been recovered from used molds or cores formed of sand bonded by ester cured alkaline phenolic resin, for effective reuse with a fresh ester-cured alkaline phenolic resin binder. In this method, the reclaimed sand is mixed with a silane solution in a quantity sufficient to provide an increase in tensile strength in a resin-bonded shape, such as a foundry mold or core produced from the reclaimed, silane-treated sand, using an ester-curable, alkaline phenolic resin.

This discovery provides methods for producing resin-bonded sand shapes, such as foundry molds or cores, wherein at least 20% by weight of the sand used is reclaimed sand that has been treated in accordance with the Iyer invention. In fact, the amount of reclaimed sand preferably is about 50% to 90%, or even 100%, of the sand used. For many foundries, economics dictate that a reclaimed sand level of 60% to 80%, at least, be used.

SUMMARY OF THE INVENTION

It has now been discovered that the ability of reclaimed sand recovered from shapes made of the sand with an alkaline resin binder, to form bonded articles of satisfactory tensile strength, can be enhanced by conditioning such reclaimed sand with a solution containing an amine, a silane, and water. This conditioning treatment is generally useful for sand that has been reclaimed from foundry sand molds and cores, especially those previously bonded with an ester-cured alkaline resin binder. It is also useful for improving the strength of used sand that has been recovered for reuse and subjected to a mechanical, thermal, or other reclamation treatment.

The present invention provides a method for conditioning reclaimed, free-flowing granular foundry sand for effective use with an ester-curable alkaline phenolic resin. In this method, the reclaimed sand is mixed with a solution comprising a mixture of a silane, an amine, and an aqueous solvent, in a sufficient quantity to provide an increase in tensile strength in a resin-bonded shape, such as a foundry mold or core produced from the conditioned reclaimed sand, using an alkaline phenolic resin. In a preferred embodiment, the sand which is to be conditioned is a mixture of reclaimed sand with up to about 80% by weight of pristine sand, and more often, from about 10% to 40% of pristine sand.

The invention provides a method for producing resin-bonded sand shapes, such as foundry molds or cores, wherein at least 20% by weight of the sand used is reclaimed sand. In fact, the amount of reclaimed sand is preferably about 50%, to 90%, or even 100%, of the sand used.

One method comprises the steps of mixing an alkaline resin binder solution, a liquid curing agent, and conditioned sand to form a raw batch; forming the desired shape from this raw batch; and permitting the binder to cure. The conditioning solution of silane and amine can be applied to the reclaimed sand either before, after, or simultaneously with the preparation of the raw batch formulation.

Another method comprises the steps of mixing alkaline resin binder solution and conditioned sand to form a raw batch; forming the desired shape from this raw batch; and then curing the raw batch with an ester curing agent in the gas or vapor phase. In this method, the sand must be mixed with the conditioning solution prior to curing the resin, but the conditioning solution may be applied either before, after, or simultaneously with preparation of the raw batch.

The invention resides, in part, in the discovery that the addition of an amine to a silane solution that is used to condition reclaimed sand for reuse with an alkaline phenolic binder resin often increases the tensile strength of the product, while reducing the amount of silane needed to produce molds or cores using an economic amount of reclaimed sand, relative to a system comprising only silane.

Treatment of reclaimed sand with a conditioning solution containing both a silane and an amine, in accordance with this invention, has been found to be more efficient and economical than treatment of reclaimed sand with undiluted silane; and more efficient than the addition of silane or a concentrated silane solution to the aqueous solution of the alkaline phenolic resin binder; and more efficient and economical than conditioning with a diluted silane solution not containing an amine.

In another aspect, this invention provides a conditioning and binder system which can be used to provide useful raw batch materials that can be shaped and cured to form shaped articles of good tensile strengths. This system comprises three separate components, including: (a) an aqueous solution containing a mixture of a silane and an amine; (b) an aqueous solution of a alkaline phenolic resin that can cure at room temperature with a curing agent having ester functionality; and (c) an ester-functional curing agent for the resin. These three components may be mixed with the reclaimed sand in any order, following which the binder will cure and harden. Alternatively, where an ester curing agent in the vapor phase is used, the sand may be mixed with the silane/amine solution (a) prior to, subsequent to, or simultaneously with mixture with the resin solution (b), after which vaporous curing agent is added to effect cure. The phenolic resin is an alkaline phenolic resin, and a curing agent with ester functionality will initiate curing at ambient temperature.

The present invention is also concerned with conditioning techniques, more generally, that can be used to improve the tensile strengths of articles made from sand, particularly sand that includes reclaimed sand, where the binder for the sand is to be an ester curable alkaline phenolic resin. Conditioning the sand is accomplished by applying to the sand a conditioning solution. Preferably this conditioning solution will comprise aqueous solvent, silane, and amine. Preferably, for ease of handling and for economy, the solvent will be either aqueous or water, and the silane and the amine will be water soluble.

Generally, the silane-amine conditioning solution will be applied to the sand as a single solution. However, it is possible to use two solutions separately, namely, a silane solution and an amine solution, with essentially the same end results.

Many commercially available resin binders that are intended for foundry applications contain a silane to improve the bond between the resin binder and the sand. However, when reclaimed sand is used, and especially reclaimed sand that has been recovered from foundry moulds or cores where the binder was an ester cured alkaline phenolic resin binder, the amount of silane present in commercially available resins is usually not sufficient to overcome the undesirable effects of residues that are present on the surfaces of the reclaimed sand. However, if sufficient silane were present, it would be possible, though not preferable, for the conditioning solution to contain amine only. Since this would be inconsistent with present commercial practices, in preferred embodiments of the invention, the conditioning solution will contain both the amine and silane values that are necessary to accomplish the objectives of the invention.

DETAILED DESCRIPTION OF THE INVENTION

The term "reclaimed sand", as used herein, refers to sand that has been formed into a resin-bonded shape with an alkaline resin binder, then recovered for reclamation and reuse, in the form of free-flowing granules. The invention was developed in particular for use with sand that had been previously bonded with an ester-cured alkaline phenolic resin binder.

Such previously bonded sand, when recovered for reclamation, can be used again, as is, with an ester-curable alkaline phenolic resin binder; however, the resin-bonded articles thus formed generally are characterized by tensile strengths that are lower than is desirable, inasmuch as the new binder does not bind well to the surfaces of the unreclaimed sand.

A surface residue on the reclaimed sand would be expected to include a film or patches of cured resin binder, carbon, partially carbonized resin binder, and dust, in addition to any other residue present. Some of these materials can be removed by water washing, and some by thermal or attrition treatments. The term "pristine sand" refers to freshly procured sand as distinguished from reclaimed sand. Such sand is ordinarily dredged or scooped from a river bank or bed, or from a lake bottom, or may be a fraction produced in the mining of gravel. Naturally such sand will have surfaces that are free of the residue that characterizes sand that has been reclaimed from foundry molds and cores.

The use of the present invention has the advantage of eliminating concern over the nature of the residue and the cause of poor tensile strength, since the use of the present invention leads to the production of resin-bonded sand articles that have satisfactory tensile strengths. The present invention provides a practical means for using reclaimed sand in conjunction with an ester-curable alkaline phenolic resin binder, to form resin-bonded sand shapes having acceptable tensile strengths, despite the presence of such residues.

The invention provides a surprising advantage over the use of a silane solution as described in copending application Ser. No. 179,392, filed Apr. 8, 1988, now abandoned, in that the addition of one or more amines often provides enhanced tensile strength and/or reduces the amount of silane needed, thus permitting a cost advantage, inasmuch as the cost of the amines is ordinarily a fraction of the cost of silane, per weight basis.

The reclaimed sand, to which the invention is applicable, is sand recovered from a shape previously bonded with an ester cured alkaline resin binder. There is uncertainty about the cause of the poor tensile strengths that are observed when reclaimed sand, previously bonded with an ester cured alkaline resin, is used with an ester curable alkaline resin binder to make a resin bonded article. There is generally an improvement in tensile strength obtained through the use of the present invention.

Reclaimed sand may be prepared for reuse by mechanical, thermal, and/or wet reclamation processes, as are known in the art. Such processes can be used to produce reclaimed sand granules of a size corresponding to a screen distribution of 25 to 140 AFS Grain Fineness, as defined in the American Foundrymen's Society's "Mold and Core Test Handbook", pp. 4.2–4.5. The most preferred grain size distribution for pristine sand is a screen distribution of about 30 to 80 AFS Grain Fineness. The most preferred grain sizes for reclaimed sand follow a similar size pattern and distribution.

THE SAND AND PHENOLIC RESIN

The sands commonly employed in the foundry industry include silica sand, quartz, chromite sand, zircon sand, olivine sand, or the like. The reclaimed sand, with which the invention is concerned, is sand that may have been previously bonded with an ester cured alkaline phenolic resin binder. This phenolic resin may have been obtained by the reaction of a phenol, such as phenol itself; a cresol; resorcinol; 3,5-xylenol; bisphenol-A; other substituted phenols; and mixtures thereof, with an aldehyde such as, for example, formaldehyde; acetaldehyde; furfuraldehyde; and aldehyde mixtures. Preferred reactants are phenol and formaldehyde in a molar ratio of phenol to formaldehyde in the range of about 1:1 to about 1:3 and more preferably about 1:1.5 to about 1:2.5.

Suitable alkaline materials used to condense these phenolic resins include sodium hydroxide, potassium hydroxide, lithium hydroxide, and mixtures thereof, with potassium hydroxide being most preferred. A part of the alkaline material may be provided by substituting for a part of the alkali metal hydroxide a divalent metal hydroxide such as, for example, magnesium hydroxide and calcium hydroxide. The molar ratio of base:phenol expressed as alkali:phenol molar ratio for these phenolic resins preferably is in the range from about 0.2:1 to 1.2:1.

Suitable phenolic resins generally are those having a weight average molecular weight preferably greater than 500, more preferably greater than 700 and still more preferably within the range of about 1000 to about 2500, as determined by gel permeation chromatography (GPC). In the preferred GPC method, used herein, the resin sample is dissolved in tetrahydrofuran (THF), then neutralized with 1N hydrochloric acid. The salt thus formed is removed by filtration, and the filtered supernatant liquid resin solution is run on a GPC apparatus to determine Mw. The apparatus included a Waters model 6000A pump, a Waters model R401 differential refractive index detector, a Waters model 730 Data Module, PL Gel 30 cm 10/ columns, porosities $10^4$, 500, and 50 Angstrom units, respectively, and a Rheodyne model 70-10 sample loop injector fitted with a 100/1 loop and a 0.5/m in-line filter situated between the injector and the first column.

To determine Mw for an aqueous alkaline resole, the procedure is as follows. Dissolve 1 g resin in 10 ml methanol. Adjust the pH to 7 on a buffered pH meter using 1N hydrochloric acid. Add 10 ml unstabilized THF and continue stirring to ensure that all of the resin is in solution. Allow any precipitated salt to settle and transfer 500/1 of the supernatant liquor to a 5 ml sample vial. Remove the solvent under vacuum for the minimum of time (about 5 mins) and at a temperature of 35° C. Add 1 ml mobile phase and filter.

Primary calibration of the columns is carried out using phenol and the oligomers formed by reaction of 2,4'-dihydroxy diphenyl methane with formaldehyde at a mol ratio of 1.5:1 with sulfuric acid catalyst and a temperature of 120° C. for 30 mins. This gives individual peaks for up to 8-ring compounds (m.wt. 850). Above this, the calibration curve is extrapolated.

Once the columns are calibrated with primary standards, resins may be run and their weight average molecular weights (Mw) determined. One of these samples may be chosen as a secondary standard to check the day-to-day tie-up, not only of retention times, but also of calculated molecular weight averages.

A standard resin solution should be injected each time the GPC system is started up and repeated until consistent retention times and molecular weights are obtained. If the calibration is satisfactory then samples may be run. If the results are consistent but vary from those expected, and there are no leaks or trapped air bubbles in the system, then the columns should be recalibrated with primary standards.

The useful aqueous solutions of the phenolic resin binder should have solids contents in the range from about 40% to about 75% by weight, and preferably about 50% to about 60% by weight. The Brookfield viscosity of such solutions is generally in the range from about 50 cps to about 750 cps at 25° C. The Brookfield viscosity of such solutions at a solids content in the range of 50% to 60% by weight, as measured after standing in a water bath at 25° C. for 3 hours, is preferably in the range of about 75 cps to 250 cps, using an RVF Model Brookfield viscometer with a No. 1 spindle at 20 r.p.m., at 25° C.

Some of the preferred phenolic resins are the more highly alkaline phenolic resins described in U.S. Pat. Nos. 4,474,904 and 4,468,359. It is noted that, for these resins, alkalinity content is expressed in terms of the molar ratio of potassium hydroxide to phenol, and that potassium hydroxide is described as the most preferred alkali. The molar ratios of KOH:phenol for the preferred potassium alkali condensed phenolic resins of this invention fall within the range of about 0.2: to about 1.2:1.

One preferred resin binder is BETASET 9512 alkaline phenolic resin, made and sold by Borden, Inc. through its units, Acme Resin and Borden Chemical. This resin has a viscosity of about 150 cps, a solids content of about 53%, specific gravity of about 1.25, pH of about 12.1, free phenol content of about 1.5%, free formaldehyde of 0.5% maximum, and a nitrogen content of about 1%. It is ester-curable, preferably using an ester in vapor or entrained droplet form, to cure by gassing.

Resin binders meeting these specifications, and particularly Borden's BETASET 9512 ester-curable phenolic resin, produce resin coated sand having excellent flowability. Cores that are blown with such resin coated sand have uniform densities and very good surface definition.

The viscosity values above, and throughout this application unless otherwise stated, are as measured on an RVF model Brookfield viscometer, with a No. 1 spindle at 20 rpm and at 25° C.

Silanes are commonly added to phenolic foundry resins to improve the adhesion to the sand and the tensile strengths of the molds and cores produced from the resins. Amounts as low as 0.05% by weight, based on the weight of the phenolic resin, have been found to provide significant improvements in tensile strength. Higher amounts of silane generate greater improvements in strength up to quantities of about 0.6% by weight, based on the weight of the phenolic resin as used in solution.

Preferred curing agents include lactones, organic carbonates, carboxylic acid esters, and mixtures thereof. These species exhibit the ester functionality necessary for "ester-cure" of the alkaline phenolic resin.

Generally, low molecular weight lactones are suitable, such as gamma-butyrolactone, valerolactone, caprolactone, beta-propiolactone, beta-butyrolactone, beta-isobutyrolactone, beta-isopentylactone, gammaisopentylactone, and delta-pentylactone. Carboxylic acid esters which are suitable include those of short and medium chain length, i.e., about $C_1$ to $C_{10}$, alkyl mono- or polyhydric alcohols with short or medium length, i.e., $C_1$ to $C_{10}$ carboxylic acids. Specific suitable carboxylic acid esters include, but are not limited to, n-butyl acetate, ethylene glycol diacetate, diacetin, glycerine tripropionate, triacetin (glycerol triacetate), dimethyl glutarate, and dimethyl adipate.

Of the organic carbonates, those which are suitable include, but are not limited to, propylene carbonate, ethylene glycol carbonate, glycerol carbonate, 1,2-butanediol carbonate, 1,3-butanediol carbonate, 1,2-pentanediol carbonate, and 1,3-pentanediol carbonate.

The foundry molds or cores from which the used sands are obtained may also have been cured by gassing with low molecular weight, gas phase carboxylic acid esters, such as $C_1$ to $C_3$ alkyl formates, including methyl formate and ethyl formate. The gaseous curing agent is preferably dispersed in a carrier gas as a vapor or an aerosol. This carrier gas should be inert so that it does not react with the alkyl formate curing agent or have some other adverse effect. Suitable examples of carrier gases include air and nitrogen.

The relative volatility of these alkyl formates enables their use as gaseous curing agent. Thus, methyl formate, which is a volatile liquid having a boiling point at atmospheric pressure of about 31.5° C., is a preferred curing agent. At ambient temperatures, it is sufficiently volatile that passing carrier gas through liquid methyl formate gives a concentrated methyl formate vapor. Ethyl and propyl formates are less volatile than the methyl ester, having boiling points in the range of 54° C. to 82° C. at atmospheric pressure.

The concentration of formate in the carrier gas is preferably at least 10% by volume and more preferably from 30% to 80% by volume. The total amount of alkyl formate used will typically be from about 10% to 110%, preferably from 15% to 35% by weight, based on the phenolic resin solution. The time required for adequate gassing depends on the size and complexity of the core or mold and on the particular resin used. It can be very short, but typically is in the range of about 1 second to about 1 minute. The gassing procedure is described more particularly in U.S. Pat. No. 4,468,359.

The foundry mold or core from which the sand is obtained generally has been used in a metal casting process. The heat of the metal casting process is believed to generate, at least in part, the residues that restrict the tensile strengths of resin-bonded articles made from the sand upon reuse.

RECLAMATION OF THE SAND

In reclaiming foundry sand, the casting is first mechanically separated from the mold or core sand, and any clumps that remain may be broken up by kneaders or lump crushers. In some cases, the sand may be used as is, however, in most cases, this recovered sand will be treated by mechanical or thermal methods before reuse.

Reclaimed sand with which this invention is particularly concerned is obtained from used, resin bonded foundry molds or cores which (1) were made with a cured, alkaline phenolic resin binder, (2) have been exposed to a metal casting process and (3) have been dismantled mechanically. The preferred particle sizes for the reclaimed sand have an AFS grain fineness of 25 to 140.

CONDITIONING THE USED SAND

After recovery, a silane solution including one or more amines is applied in a quantity sufficient to increase the tensile strength of foundry cores and molds or other resin-bonded articles made from such silane-treated sand Preferred amounts of silane solution including one or more amines fall within the range of 0.02% to less than 1% by weight, based on the weight of the reclaimed sand. More preferably, the quantity of the conditioning solution falls within the range of about 0.1% to 0.5% based on the weight of reclaimed sand.

Suitable Silanes

The silanes which are used are diluted in an aqueous solvent, to facilitate application to the sand.

Preferably, the conditioning solution used has a concentration of silane of at least about 0.1% by weight and less than about 40% by weight, based on the total weight of the solution, including silane, amine, and solvent. More preferably, the silane concentration falls within the range of between about 0.5% and about 20% by weight, and most preferably between about 1% and about 10% by weight, based on the total weight of conditioning solution. These more preferred silane concentrations apply where quantities of the conditioning solution used are in the preferred range of about 0.1% to about 0.5% by weight, based on sand.

Preferably, the conditioning solution used has a concentration of amine of at least about 0.1% by weight, and less than about 30 percent by weight, based on the total weight of the solution, including silane, amine and solvent. More preferably, the amine concentration falls within the range of between about 0.5% and about 20% by weight, and most preferably between about 1% and about 10% by weight, based on the total weight of solution. These more preferred amine concentrations apply where the quantities of the conditioning solution used are in the preferred range of about 0.1% to about 0.5% by weight, based on sand.

Intimate, uniform mixing of the reclaimed sand and the conditioning solution is important for obtaining high tensile strengths. High speed continuous mixers are effective, and provide better results than less preferred low speed equipment.

In one embodiment, where a liquid ester curing agent is used, in conditioning the reclaimed used sand, the conditioning solution may be added to the sand simultaneously with or subsequent to the addition of the binder solution and the curing agent. The effective treatment of the surfaces of the reclaimed sand is apparently not inhibited by the presence of the resin binder solution and the curing agent.

In another embodiment, where a vaporous ester curing agent is used, the reclaimed said may be mixed with the conditioning solution prior to, subsequent to, or simultaneously with mixing with the binder solution and subsequent gassing with the curing agent.

The silanes which are effective in enhancing the tensile strength of foundry cores and molds made using reclaimed sand are well known in the foundry industry.

Suitable silanes include those conforming to the formula R'Si(OR)$_3$, wherein R' is a $C_2$–$C_6$ alkylene group bonded to an amino, epoxy, mercapto, glycidoxy, ureido, hydroxy, hydroxy-$C_1$–$C_6$ alkylamino, amino-$C_1$–$C_6$ alkylamino, $C_2$–$C_6$ alkenyl or $C_2$–$C_6$ alkenyl-carboxy group, and the several "R" groups may be the same or different, and are selected from $C_1$–$C_6$ alkyl and $C_1$–$C_6$ alkoxy-substituted $C_1$–$C_6$ alkyl groups. Such silanes include: gamma-hydroxypropyl trimethoxy silane; hydroxymethyl diethoxymethyl silane; N-(gamma-aminopropyl)-gamma-aminopropyl trimethoxy silane; N-(beta-aminoethyl)-gamma-aminopropyltrimethoxy silane; gamma-carboxypropyl triethoxy silane; delta-aminobutyl trimethoxy silane; gamma-mercaptopropyl trimethoxy silane; gamma-aminopropyl triethoxy silane; gamma-ureidopropyl triethoxy silane; and gamma-glycidoxypropyl trimethoxy silane.

Suitable silanes are not limited to those described above. United Kingdom patent specification 876,033, for example, describes suitable silanes that do not conform to the formula above. They include, for example, p-aminophenyl triphenoxy silane; p-hydroxyphenyl trichloro silane; di-p-hydroxyphenyl diethoxy silane, and p-aminophenylmethyl triethoxy silane, all of which are believed to be useful.

The most preferred silanes are amino-silanes, preferably aminoalkyl alkoxy silanes which conform to the general formula $$H_2N(CH_2)_nSi(OR^1)_{3-x}(R^2)_x$$

wherein n equals a whole number of from 2 to 4, $R^1$ is an alkyl group of from 1 to 4 carbon atoms, $R^2$ is an alkyl group of from 1 to 4 carbon atoms or phenyl, and x is 0 or 1. Specific examples of silanes, which have not been described earlier, include gamma-aminopropyl trimethoxy silane; gamma-aminobutyl triethoxy silane; gamma-aminopentyl triethoxy silane; gamma-aminopropyl diethoxymethyl silane; gamma-aminopropyl diethoxy ethyl silane; gamma-aminopropyl diethoxyphenyl silane; delta-aminobutyl diethoxyphenyl silane; delta-aminobutyl diethoxymethyl silane; and delta-aminobutyl diethoxymethyl silane.

Also suitable are diaminosilanes, also referred to as N-(aminoalkyl) aminoalkyl silanes, of the formula, $$H_2N-(CH_2)_m-NH-(CH_2)_nSi(OR^1)_{3-x}R^2_x$$

wherein n is a whole number of from 2 to 4, m is a whole number of from 2 to 3, $R^1$ is alkyl group of from 1 to 4 carbon atoms, $R^2$ is an alkyl group of from 1 to 4 carbon atoms and x is 0 or 1. Specific examples of such silanes include: N-(gamma-aminopropyl)-gamma-aminopropyl triethoxy silane; N-(gamma-aminopropyl)-gamma-aminopropyl trimethoxy silane; and N-(beta-aminoethyl)-gamma-aminopropyl dimethoxymethyl silane.

U.S. Pat. No. 4,256,623 describes suitable alkyl-substituted species of the aminoalkyl alkoxy silanes and diaminosilanes. These more particularly include: N-methyl-gamma-aminopropyl triethoxy silane; N-ethyl-gamma-aminopropyl trimethoxy silane; N-methyl-gamma-aminopropyl dimethoxymethyl silane; and N-(N-methyl-beta-aminoethyl)-gamma-aminopropyl dimethoxymethyl silane; N-(gamma-aminopropyl)-N-methyl-gamma-aminopropyl dimethoxymethyl silane.

Commercially available aqueous silane solutions generally include one or more stabilizers, as are known in the art to prevent or to limit polymerization of the silane, or the silane may be present in a polymerized form.

Suitable Solvents

Suitable solvents comprise water alone or in admixture with water-compatible organic solvents, preferably polar organic solvents, water, and mixtures thereof. Water is inexpensive and higher tensile strengths are often obtained when it is used.

The solvent selected is determined by the solubility of the silane. The aminoalkylsilanes are generally available in aqueous solutions, typically at 40% by weight concentration. It is preferable for any organic solvent, if used in addition to water, to be water soluble so that it is compatible with the resin binder solution which is an aqueous solution. Suitable organic solvents include alcohols and glycols of from 1 to 6 carbon atoms such as methanol and ethanol. The alcohols are suitable solvents for the ureido silanes and glycidoxy silanes described above. Water is the preferred solvent for aminosilanes.

Suitable Amines

The amines which form a part of the conditioning solution are those which are effective in enhancing the tensile strength of foundry cores and molds obtained from reclaimed sand when bonded with a resin binder. They are organic amines and are preferably water soluble.

Low molecular weight amines such as ethylene diamine have proved satisfactory but are considered to be too volatile and odorous to be useful in treating reclaimed sand in foundries. Consequently, the preferred amines include diethylene triamine and higher molecular weight amines such as triethylene tetraamine, tetraethylene pentaamine, tetramethylene diamine, and hexamethylenediamine. Generally, amines having a boiling point of about 115° C. or more are preferred.

In addition to these preferred species of water soluble amines, there are many useful amines for present purposes that are only slightly water soluble, or that would be classified as insoluble. These may be used in an aqueous-based organic solvent, preferably one that is either water soluble itself or is readily miscible with water. As a class, the amines are generally polar in nature, and consequently the use of a polar solvent is appropriate, such as the alcohols. Generally, the higher alkyl amines are less desirable because of their odors, and the aromatic amines should be avoided because of their toxicity.

Variations on the Use of the Conditioning Solution

Many commercially available foundry resins contain a silane. Despite this, when reclaimed sand is used in a foundry, where the reclaimed sand was previously used with an alkaline resin binder, and particularly with an ester-curable alkaline phenolic resin binder, the silane content of the commercially available foundry resins does not provide a sufficient amount of the silane component required by this invention to produce the kinds of tensile strengths that are necessary for acceptable molds and cores. This fact led to the development of the invention that is disclosed and claimed in the parent application, Ser. No. 179,392, filed Apr. 8, 1988, now abandoned, where the reclaimed sand is treated with an aqueous silane solution. The present invention improves over that earlier invention as disclosed in the parent application by incorporating, in the conditioning solution that is used to treat the reclaimed sand, one or more amines as described above and as exemplified in the Examples below.

However, the use of a conditioning solution incorporating both silane and amine in one solution, while representing a preferred embodiment of the invention, is not essential to the achievement of the goal of the invention, which is the production of suitable tensile strengths in the moulds, cores and other shapes, made of reclaimed sand and bonded with alkaline phenolic resin binders.

Thus, it is feasible, though possibly unstable, to incorporate appropriate amounts of amine and silane additives in the resin binder. When this is done, the amount of silane in aggregate is well above that amount ordinarily present in the commercially available foundry resins.

Similarly, it is possible to use a separate silane conditioning solution, as in the parent application, and incorporate the amine in the resin binder rather than in the conditioning solution, although stability may again suffer. The reverse situation is also true. The silane can be added to the resin binder, and the amine can be used in the form of a conditioning solution. It is also feasible to premix the conditioning solution with the resin; however, storage stability once again may suffer. The important thing is that both added amine and added silane be utilized with the alkaline foundry resin binder.

While these variations are possible, the preferred embodiment of the invention represents the use of a single conditioning solution that contains both the amine and silane values that are necessary to the achievement of satisfactory tensile strengths in shapes, and particularly in moulds and cores, where all or a substantial part of the sand is reclaimed sand previously used in conjunction with an alkaline resin binder, especially an ester curable phenolic resin binder.

The present invention represents an improvement over that described in Ser. No. 179,392, (the parent of the present application), now abandoned. In that application, a conditioning solution comprising a silane but no amine is used to improve tensile strengths of shapes produced from reclaimed sand treated therewith. In many cases, a still further improvement in tensile strength is realized when the amine is added to the conditioning solution. Beyond that, however, a significant economic advantage is realized, inasmuch as the presence of the amine reduces the amount of silane required, since the cost of the silane may be several times the cost of the amine per weight basis.

PRODUCTION OF FOUNDRY MOLDS AND CORES

This invention also includes methods for producing shapes, especially foundry molds and cores, from a curable binder system and sand, of which at least 20% by weight is used sand that has been reclaimed, generally from dismantled foundry molds or cores which have been used and that were made with an alkaline resin binder, and particularly with an ester-cured alkaline phenolic resin binder.

These methods comprise forming a raw batch material comprising reclaimed sand from sand previously bonded with an alkaline resin binder, a solution fresh alkaline resin binder, and a curing agent, or alternatively, forming the raw batch material from the resin binder and conditioned sand, and subsequently shaping and curing the raw batch with a gas phase ester curing agent. At least 20% of the sand, and preferably from 50% to 99%, or even 100%, is used reclaimed sand from articles such as foundry molds or cores. This reclaimed sand has been conditioned, preferably, to improve its performance, by the application to it of a conditioning solution containing a silane and one or more amines, both in sufficient quantity to increase the tensile strength of articles produced from the raw batch.

The conditioning solution may be applied to the reclaimed sand prior to mixing the sand with the resin binder and liquid curing agent, or at the same time, or even afterward.

After all of the components are mixed, cure of the binder is effected to form the foundry shape.

THE RESIN BINDER

The resin binder used in the raw batch preferably comprises an aqueous solution of an ester-curable, alkaline phenolic resin that can cure at room temperature with a curing agent having ester functionality. Most preferably, the phenolic binder is an aqueous solution of an alkaline phenol formaldehyde resin wherein (i) the solids content is in the range from 40% to 75%, preferably 50% to 75%, (ii) the weight average molecular weight (Mw) is from 500 to 2500, preferably 700 to 2000, and more preferably from 800 to 1700, (iii) the formaldehyde:phenol molar ratio is from 1:1 to 3:1, preferably 1.2:1 to 2.6:1, (iv) the alkali:phenol molar ratio is preferably from 0.2:1 to 1.2:1, but may be in the narrower range of 0.5:1 to 1.2:1, (v) the alkali used comprises sodium hydroxide, potassium hydroxide, and their mixtures, (vi) said solution will usually (but not necessarily) contain a silane in the amount of 0.05% to 3.0% by weight of said aqueous resin solution, and (vii) said resin is curable at room temperature with: $C_1$–$C_3$ alkyl formates; organic esters formed from $C_1$–$C_{10}$ carboxylic acids and mono-and polyhydric alcohols; and low molecular weight lactones including butyrolactone, propiolactone, caprolactone, and mixtures thereof.

The amount of alkaline phenolic resin in the binder solution must be sufficient to provide the necessary bond between sand particles. Quantities of the resin solution, in the range of about 0.5% to about 8% by weight, based on the weight of sand, are preferred and amounts below about 2% by weight are most preferred, where the phenolic resin solution is at a solids content of about 40% to about 75% by weight and preferably about 50% to about 60% by weight. The Brookfield viscosity for these resin solutions should fall in the range from about 50 cps to about 750 cps, at a solids content of about 40% to about 75%, and is preferably about 75 cps to about 250 cps, at a solids content of about 50% to about 60%.

Borden's BETASET ester-curable phenolic resin binders have been identified as preferred resin binders.

Borden's BETASET 9512 ester-curable alkaline phenolic resin binder, in an aqueous solution, is a preferred resin binder for use in the practice of the present invention. It typically has a viscosity of about 150 cps, a solids content of about 53%, a specific gravity of about 1.25, a pH of about 12.1, a free phenol content of about 1.5%, a free formaldehyde content of 0.5% maximum, and a nitrogen content of about 1%. It is ordinarily cured by gassing with methyl formate. When used with pristine lake sand, this resin binder ordinarily is used in an amount of about 2% by weight of the binder based on sand. With Wedron silica sand, about 1.75% by weight of the resin solution based on sand produces a suitable tensile strength.

Binder solutions with a solids content below about 50% are not preferred. Binder solutions with a solids content above about 75% by weight are generally not used because the viscosity is too high.

The third necessary component is a curing agent. The preferred curing agents are the lactones, organic carbonates, and carboxylic acid esters, or mixtures of such agents. For Borden's Betaset phenolic resin binder, ordinarily the curing agent is used in the vapor state.

Thus the methods for producing foundry molds or cores of this invention include those methods wherein the binder is cured by gassing with an alkyl formate, either directly or in aerosol or droplet form in a carrier gas. These methods have been described more particularly above and in U.S. Pat. No. 4,468,359.

The amount of curing agent used should be sufficient to cure the resin binder under curing conditions, i.e., generally at ambient temperature and pressure. Amounts of curing agent of from about 10% to 110%, based on the weight of binder solution, often are useful.

A preferred ingredient of the resin binder is a silane which is effective in increasing the tensile strength of the product. Suitable silanes are those described above. The quantity of silane added to an aqueous alkaline phenolic resin binder solution, that is ester-curable, is sufficient to provide an increase in tensile strength in the article produced. Such quantities of silane generally fall within the range of about 0.05% to 3% by weight, based on the weight of the resin binder solution.

The conditioning solution may be mixed with the reclaimed sand either prior to, subsequent to, or simultaneously with the formation of the raw batch sand, resin binder, and curing agent, for example, in a continuous mixer as commonly used in the foundry industry. The exception is when the binder in the raw batch is curable by gassing with an alkyl formate. In this case, the reclaimed sand is mixed with the conditioning solution prior to, subsequent to, or simultaneously with the resin and then the resin-coated sand is formed into the desired shape, which may then be cured by applying vaporous curing agent.

The advantages of this invention and its preferred embodiments will be demonstrated more fully by the following Examples, that demonstrate the practice of the invention. In these Examples, and elsewhere throughout the specification, parts and percentages are by weight, and temperatures are in degrees Celsius, unless expressly indicated to be otherwise.

Examples 1 and 2, below, represent controls, wherein reclaimed sand is either untreated, or treated only with a silane solution, then coated with a resin binder that is then ester-cured.

EXAMPLE 1

Use of a Silane Conditioning Solution at 16% Concentration with 100% Reclaimed Sand Example 1 illustrates the treatment of reclaimed sand with a silane solution, when preparing foundry cores and molds by a vapor cure method.

The reclaimed sand was divided into two portions that were pretreated as follows.

Control specimens 1A—The reclaimed sand was untreated.

Control specimens 1B—The reclaimed sand was pretreated at 25° C. with 0.5% of a silane solution made up by mixing together 0.2% of a silane solution and 0.3% by weight water, both based on the weight of sand. The initial silane solution contained gamma-aminopropyl triethoxy silane at a concentration of 40% by weight, in water. The pretreatment with the diluted (16%) silane solution was effected by mixing the dilute solution and the sand in a Hobart Kitchen Aid Mixer for about 1 minute, using 1500-2500 gms. of reclaimed sand.

The sand used in this Example was obtained from molds and cores that had been used in casting iron and steel. In forming these molds and cores, the binder solution used had comprised an ALpHASET 9000 potassium phenol formaldehyde binder solution. This binder solution had a Brookfield viscosity in the range of 100-150 cps, as determined utilizing a Model RVF Brookfield Viscometer with a No. 1 spindle at 20 r.p.m. at 25° C., at a solids content of 53% to 58%. This resin binder solution included about 0.4% by weight, based on the weight of the resin solution, of gamma-aminopropyltriethoxy silane. Triacetin was used as the curing agent. After the binder-triacetin mixture was coated on the sand, the sand was formed into molds and cores, and cure took place at room temperature.

The used foundry molds and cores were dismantled after use by shaking out any loose sand and then breaking up the lumps utilizing a dry attrition unit produced by Redford Carver Foundry Products, Sherwood, Oregon. Sand having an AFS Grain Fineness of 48.7 and an L.O.I. (Loss on Ignition) of 0.80% ((wt. loss/initial wt.)×100%) was obtained.

The mechanically reclaimed sand was then brought to a temperature of about 25° C. The reclaimed sand was divided into two portions, identified as control sand 1A and control sand 1B. The sand in the control 1A portion was not treated with a silane solution. The sand in the control 1B portion was treated with a silane solution by mixing it with a 16% solution of gamma-aminopropyl triethoxy silane in a high speed mixer.

1.5% by weight of ALpHASET 9000 alkaline phenolic resin solution having a solids content of about 54% by weight, based on the weight of sand, was then added to each portion of the reclaimed sand, and mixed for two minutes. The phenol:formaldehyde molar ratio for the resin was 1:1.8. The KOH:phenol molar ratio for the resin was 0.85:1.0. The resin binder solution additionally contained gamma-aminopropyl triethoxy silane at a concentration about 0.4% by weight, based on the weight of binder solution.

After mixing, each portion of the sand was blown with a Redford Carver Core Blower (a trademark of Dependable Foundry Equipment Company, Sherwood, Oregon), using 80 psig air pressure for about one-half second, into separate three cavity coreboxes respectively, to make the Standard American Foundrymen's Society's 1" dogbone tensile briquettes.

After blowing in the sand, each corebox was gassed for 5 seconds with methyl formate vapor generated in a Cerjet gas generator (also a tradename of Dependable Foundry Equipment). After gassing, the dogbones were ejected and then allowed to stand.

The tensile strength measurements were made using a Dietert Universal Sand Strength Machine 400-1, fitted with a Tensile Core .Strength Accessory 610-N. Measurements of tensile strength were made for each set of 3-4 dogbones, at the time intervals indicated in Table 1, following ejection, and the average values were determined. The average tensile strength values for dogbones made from the sand of each of Controls 1A and 1B are reported in Table 1 below.

Control specimen 2A—The reclaimed sand was not conditioned.

Control specimen 2B—reclaimed sand at 25° C. was conditioned by being pretreated with 0.3% of a 13.3% silane solution in water, based on the weight of sand. The silane was gamma-aminopropyl triethoxy silane.

This pretreatment was done by adding the sand to a Hobart Kitchen Aid Mixer, bringing it to 25° C., adding the silane solution, and then mixing the sand and silane solution for about one minute. The test dogbones were prepared by mixing the above-described resin and sand with curing agent in the mixer and mixing for another 40 seconds, and forming the mixture into 1-inch dogbone tensile briquettes in a Dietert 696 corebox. The dogbones were then tested as in Example 1. The average values for 3-4 measurements of the tensile strengths

TABLE 1

| Test | Silane Solution Used, at 16% Concentration, % Based on Sand Wt. (wt %) | Tensiles (psi) Hrs: | | | | % Improvement In Tensile Strength Hrs: | | | |
|---|---|---|---|---|---|---|---|---|---|
| | | 1 | 2 | 4 | 24 | 1 | 2 | 4 | 24 |
| Control 1A Specimens | none | 23 | 24 | 26 | 27 | — | — | — | — |
| Control 1B Specimens | 0.5% | 32 | 33 | 39 | 47 | 39% | 37% | 50% | 74% |

The results in Table 1 show that pretreatment of the of the dogbones produced are reported in Table 2.

TABLE 2

| Test | Silane Solution Used, at 13.3% Concentration % Based on Sand Wt. (wt %) | Tensiles (psi) Hrs: | | | | % Improvement In Tensile Strength Hrs: | | | |
|---|---|---|---|---|---|---|---|---|---|
| | | 1 | 2 | 4 | 24 | 1 | 2 | 4 | 24 |
| Control 2A | none | 15 | 20 | 25 | 45 | — | — | — | — |
| Control 2B | 0.3% | 33 | 50 | 60 | 90 | 120% | 150% | 140% | 100% | reclaimed sand with a silane solution as in Control specimens 1B resulted in tensile improvements over the use of reclaimed sand which was not pretreated (Control 1A).

EXAMPLE 2

Use of Smaller Quantity of a 13.3% Silane Conditioning Solution with 100% Reclaimed Sand This control example again illustrates conditioning of reclaimed sand obtained from ester-cured alkaline phenolic binder systems but a slightly more dilute silane solution.

The reclaimed sand used in this Example was again obtained from foundry molds and cores that had been used in casting iron and steel. In forming these molds and cores, the resin binder solution utilized had been an ALpHASET 9000 potassium phenol formaldehyde binder solution, as in Example 1. The resin solution again included about 0.4% by weight, based on the weight of the resin binder solution, of gamma-aminopropyltriethoxy silane. The curing agent was triacetin.

The molds and cores were dismantled after use, as in Example 1. The sand obtained was the same as that of Example 1.

The resin binder solution used to prepare the dogbones from the reclaimed sand was a potassium phenol formaldehyde resin having a Brookfield viscosity of about 100 cps at 53.4% by weight solids content. The phenol:formaldehyde molar ratio for the resin was 1:1.7 and the KOH:phenol molar ratio was 0.83:1. This resin binder did not contain silane.

Dogbones were prepared from two separate portions of the reclaimed sand as follows:

The data in Table 2 illustrate that substantial improvements are obtained in tensile strengths then the reclaimed sand is conditioned by being pretreated with a silane solution, particularly when the resin solution does not contain a silane.

EXAMPLES 3-6

Use of Silane-Amine Conditioning Solutions

Examples 3, 4, 5 and 6 demonstrate the effectiveness of this invention in improving the tensile strengths of specimens obtained by using reclaimed sand which is conditioned with a solution containing both an amine and a silane. Examples 3 through 6 each compare a control, where a silane conditioning is used, and where a conditioning solution is used that contains both an amine and a silane.

Two types of reclaimed sand were used for testing. The first type, called "light" sand, was a reclaimed sand of lighter color that contained a higher level of burned-off sand grains than the second type, called "dark" sand. The dark sand was darker in color, contained fewer burned-off grains, and produced lower tensile strengths than the light reclaimed sand.

The sands used in these examples were obtained from foundry molds and cores that had been used in casting iron. In forming these molds and cores, the binder solution utilized was a BETASET 9511 potassium phenol formaldehyde binder solution. The binder solution had a Brookfield viscosity of approximately 155 cps at a solids content of approximately 55% by weight. This binder solution included gamma-aminopropyl triethoxy silane, and it was cured with a gaseous curing agent, methyl formate.

The following test data were developed from direct comparisons between the use of a conditioning solution containing a mixture of an amine and a silane, with appropriate control treatments.

EXAMPLES 3–5

The dogbones prepared in Examples 3, 4, and 5 were made by (1) premixing pristine sand and reclaimed sand in a Hobart Kitchen Aid mixer; (2) adding a conditioning solution; (3) mixing for two minutes; (4) adding an alkaline phenol formaldehyde resin, and (5) mixing an additional two minutes.

The silane-only conditioning solutions used in these Examples are as follows. A/B Max 500 solution, from ACME Resin, used in the controls, consists of 25% of AMEO-40 silane and 75% water. AMEO-40 silane is available from Union Carbide Corporation, and is a 40% aqueous solution of 3-aminopropyl triethoxy silane. The commercial literature refers to this product as a silane polymer.

The DETA Mix solution was prepared by mixing different amounts of water, diethylene triamine, and A1100 silane (gamma-aminopropyl triethoxy silane, available from Union Carbide Corporation).

EXAMPLE 3

In this Example, dogbones were produced by mixing 80% "light" reclaimed sand with 20% pristine sand. The sand mixtures were mixed with a silane conditioning solution and subsequently mixed with BETASET 9512 resin solution, an ester-curable alkaline phenolic resin.

BETASET 9512 resin solution, from ACME, is a potassium phenolic resin that is ester-curable, having a Brookfield viscosity of about 150 cps at a solids content of about 53% by weight.

Control specimen 3A were prepared by (1) mixing "light" reclaimed sand with pristine sand; (2) mixing A/B Max 500 silane conditioning solution (aminopropyl triethoxy silane aqueous polymer) with the sand; and (3) mixing BETASET 9512 resin solution with the conditioned sand mixture.

The amounts of each component used for the Control Specimens 3A are set out in Table 3A.

TABLE 3A

| Parts by Wgt. | Ingredients of Control Specimens 3A<br>Ingredient |
|---|---|
| 100 | Sand (80% "light" reclaimed/20% pristine) |
| 0.3 | A/B Max 500 silane conditioning solution |
| 1.5 | BETASET 9512 resin solution (as is) |

Test Specimens 3A were prepared by (1) mixing "light" reclaimed sand with pristine sand; (2) mixing DETA Mix-1 conditioning solution, which contains a mixture of 3.3% of gamma-aminopropyl triethoxy silane, 3.3% of diethylene triamine, and 93.4% of water, with the sand mixture; and (3) mixing BETASET 9512 resin solution with the conditioned sand mixture.

The amounts of each component used for Test Specimens 3A are set out in Table 3B.

TABLE 3B

| Parts by Wt. | Ingredients of Test Specimens 3A<br>Ingredient |
|---|---|
| 100 | Sand (80% "light" reclaimed/20% pristine) |

TABLE 3B-continued

| Parts by Wt. | Ingredients of Test Specimens 3A<br>Ingredient |
|---|---|
| 0.3 | DETA Mix-1 silane-amine conditioning solution |
| 1.5 | BETASET 9512 resin solution (as is) |

After mixing, the sand was blown into cores and gassed as in Example 1, and the tensile strengths of the dogbones were measured, using a Detroit Testing Machine, Model CST.

3 to 4 measurements of tensile strength were again made for this group of specimens and the average values were determined. The average tensile strength values are given in Table 3C below.

TABLE 3C

| | Tensile Strengths (psi) of Control Specimens 3A and Test Specimens 3A at Different Time Intervals from Cure | | | |
|---|---|---|---|---|
| | 1 minute | 30 minutes | 60 minutes | 24 hours |
| Control Specimens 3A | 62 | 79 | 75 | 82 |
| Test Specimens 3A | 75 | 86 | 89 | 95 |

The results in Table 3C show that treatment of reclaimed sand with of a silane-amine conditioning solution results in tensile improvements in test specimens relative to those treated with a silane solution alone, when using an alkaline phenol formaldehyde resin binder which is vapor-cured. This is true even though the amount of silane actually used in the silane-amine solution was substantially less than the amount of silane used in the silane-only conditioning solution.

EXAMPLE 4

In this Example, 80% "dark" reclaimed sand was mixed with 20% pristine sand. The several selected portions of the sand mixture were then mixed with a silane solution, and subsequently were mixed with BETASET 9511 resin solution, an ester-curable alkaline phenolic resin available from ACME Resin. The resin-coated conditioned sand was free-flowing and easily blown to make test specimens.

Control specimens 4A were prepared by (1) mixing "dark" reclaimed sand with pristine sand; (2) mixing A/B Max 500 silane-only conditioner (aminopropyl triethoxy silane polymer solution) with the sand mixture; and (3) mixing BETASET 9511 resin solution with the sand mixture.

The amounts of each component used in making the Control 4A specimens are set out in Table 4A below.

TABLE 4A

| Parts by Wt. | Ingredients of Control Specimens 4A |
|---|---|
| 100 | Sand (80% "dark" reclaimed/20% pristine) |
| 0.3 | A/B Max 500 Silane Conditioning Solution |
| 1.5 | BETASET 9511 resin solution |

Test Specimens 4A were prepared by (1) mixing "dark" reclaimed sand with pristine sand; (2) mixing DETA Mix silane-amine conditioning solution which contained 3.3% each of the silane and of diethylene triamine, and 93.4% of water, as above, with the sand mixture; and (3) mixing BETASET 9511 resin solution with the sand mixture. The amounts of each component of Test Specimens 4A are set out in Table 4B. The coated sand flowed freely and was blowable.

TABLE 4B

| Parts by Wt. | Ingredients of Test Specimens 4A |
|---|---|
| 100 | Sand (80% "dark" reclaimed/20% pristine) |
| 0.3 | DETA Mix 1 silane-amine conditioning solution |
| 1.5 | BETASET 9511 resin solution (as is) |

Test Specimens 4B were prepared by (1) mixing "dark" reclaimed sand with pristine sand; (2) mixing the DETA Mix 2 silane-amine conditioning solution, which comprised 6.6% of the amine, 3.3% of the silane, and 91.1% of water, with the sand mixture; and (3) mixing BETASET 9511 resin solution with the sand mixture.

The amounts of each component of Test Specimens 4B are set out in Table 4C.

TABLE 4C

| Parts by Wt. | Makeup of Test Specimens 4B |
|---|---|
| 100 | Sand (80% "dark" reclaimed/20% pristine) |
| 0.3 | DETA Mix 2 silane-amine conditioning solution |
| 1.5 | BETASET 9511 resin solution (as is) |

After the sand was conditioned and then coated with resin, it was free-flowing and easily blown. The corebox was then gassed with methyl formate, to cure the resin. The tensile strength measurements on the dogbones were made as described in Example 3.

3 to 4 measurements of tensile strength were made for each type of specimen and the average values were determined and are reported in Table 4D below.

TABLE 4D

Tensile Strengths (psi) of Control Specimens 4A and Test Specimens 4A and 4B at Different Time Intervals from Cure

|  | 1 minute | 30 minutes | 60 minutes | 24 hours |
|---|---|---|---|---|
| Control Specimens 4A | 36 | 47 | 46 | 42 |
| Test Specimens 4A | 39 | 53 | 52 | 60 |
| Test Specimens 4B | 49 | 55 | 56 | 63 |

The results in Table 4D show that, as in Example 3, the treatment of reclaimed sand with a silane-amine solution results in tensile improvements in test specimens relative to those treated with a silane solution alone, even though the amount of silane actually used in the silane-amine solution was substantially less than the amount of silane used in the silane-only solution.

EXAMPLE 5

In this Example, dogbones were produced by first mixing 50% "light" reclaimed sand with 50% pristine sand. The several portions of this sand mixture were mixed with a silane conditioning solution and subsequently mixed with BETASET 9511 resin solution (an ester-curable alkaline phenolic resin available from ACME Resin, described above).

Control Specimens 5A were prepared by (1) mixing "light" reclaimed sand with pristine sand; (2) mixing A/B Max 500 silane (3-aminopropyl triethoxy silane polymer) solution with the sand mixture; and (3) mixing BETASET 9511 resin solution with the sand mixture.

The amounts of each component of Control Specimens 5A are set out in Table 5A.

TABLE 5A

| Parts by Wt. | Ingredients of Control Specimens 5A |
|---|---|
| 100 | Sand (50% "light" reclaimed/50% pristine) |
| 0.1 | A/B Max 500 silane solution |
| 1.5 | BETASET 9511 resin solution |

Test Specimens 5A were prepared by (1) mixing "light" reclaimed sand with pristine sand; (2) mixing DETA Mix 1 silane-amine solution, which contained 3.3% of each of silane and diethylene triamine in water, with the sand mixture; and (3) mixing BETASET 9511 resin solution with the sand mixture.

The amounts of each ingredient of Test specimens 5A are set out in Table 5B.

TABLE 5B

| Parts by Wt. | Ingredients of Test Specimens 5A |
|---|---|
| 100 | Sand (50% "light" reclaimed/50% pristine) |
| 0.1 | DETA Mix 1 silane-amine solution, in water |
| 1.5 | BETASET 9511 resin solution |

After mixing the sand, conditioning it, and coating it with resin, as above, it was blown into coreboxes and gassed with methyl formate to cure the dogbone specimens. Tensile strength measurements were made using the testing machine described in Example 3.

3 to 4 measurements of tensile strength were made for each set of 3-4 dogbones, and the average values were determined and are reported in Table 5C below.

TABLE 5C

Tensile Strengths (psi) of Control Specimens 5A and Test Specimens 5A at Time Intervals After Cure

|  | 1 minute | 30 minutes | 60 minutes | 24 hours |
|---|---|---|---|---|
| Control Specimens 5A | 77 | 104 | 92 | 116 |
| Test Specimens 5A | 79 | 91 | 89 | 114 |

The results in Table 5C show that treatment of reclaimed sand with a silane-amine solution results in comparable tensile strengths in test specimens relative to similar specimens that were conditioned using a silane solution alone, when using an alkaline phenol formaldehyde resin binder which is vapor cured with an ester, even though the amount of silane actually used in the silane-amine solution was substantially less than the amount of silane used in the silane-only solution.

EXAMPLE 6

The test dogbone specimens prepared in Example 6 were produced by (1) premixing pristine sand and reclaimed sand in a Hobart Kitchen Aid Mixer; and (2) simultaneously adding a silane conditioning solution and an alkaline phenol formaldehyde resin.

In this Example, dogbones were produced by mixing 80% "light" reclaimed sand with 20% pristine sand. The sand mixtures were simultaneously mixed with a silane solution and with BETASET 9511 resin solution.

Control Specimens 6A were prepared by (1) mixing "light" reclaimed sand with pristine sand and (2) simultaneously mixing A/B Max 500 silane solution (gamma-aminopropyl triethoxy silane polymer solution) and BETASET 9511 resin with the sand mixture.

The amounts of each ingredient of Test Specimens 6A are set out in Table 6A below.

TABLE 6A

| Parts by Wt. | Ingredients of Control Specimens 6A |
|---|---|
| 100 | Sand (80% "light" reclaimed/20% pristine) |
| 0.3 | A/B Max 500 Silane Solution |
| 1.5 | BETASET 9511 resin solution |

Test Specimens 6A were prepared by mixing "light" reclaimed sand with pristine sand and simultaneously mixing the DETA Mix 1 silane-amine solution (3.3% of each of diethylene triamine and gamma-aminopropyl triethoxy silane in water) and BETASET 9511 resin solution with the sand mixture.

The amounts of each ingredient of Test specimens 6A are set out in Table 6B.

TABLE 6B

| Parts by Wt. | Ingredients of Test Specimens 6A |
|---|---|
| 100 | Sand (80% "light" reclaimed/20% pristine) |
| 0.3 | DETA Mix 1 Silane-amine Solution |
| 1.5 | BETASET 9511 resin solution |

After mixing the sand, conditioner and resin solution, the conditioned and resin-coated sand was blown and gassed as described in previous Examples.

The tensile strength measurements were made as in Example 3 above; the average tensile strength values of 3–4 measurements for each set of test specimens are given in Table 6C below.

TABLE 6C

| Tensile Strengths (psi) of Control Specimens 6A and Test Specimens 6A at Different Time Intervals After Cure | | | | |
|---|---|---|---|---|
| | 1 minute | 30 minutes | 60 minutes | 24 hours |
| Control Specimens 6A | 44 | 61 | 53 | 76 |
| Test Specimens 6A | 56 | 74 | 62 | 87 |

As in Tables 3C and 4D, the results in Table 6C show that conditioning with a silane-amine solution results in tensile improvements in test specimens over those treated with a silane solution alone. This was true whether or not the silane-amine conditioning solution was added to the sand prior to or simultaneously with the resin solution. Again, this was true even though the amount of silane used to prepare Control Specimen 6A was substantially more than the amount of silane used to prepare Test Specimens 6A.

EXAMPLE 7

This control Example demonstrates that improvements in tensile strength occur because of conditioning treatment with a silane solution, even in the absence of an amine, relative to no conditioning treatment, when a different resin is used (ALPHASET potassium phenolic resin, described herein).

In this Example, reclaimed sand was conditioned with an aqueous solution of gamma-aminopropyl triethoxy silane and then used to form control specimens (dogbones). These test specimens were compared to specimens made from the reclaimed sand that had not been conditioned.

The control specimens were made from reclaimed sand as described below.

Control Specimens 7A—The reclaimed sand was not conditioned.

Control Specimens 7B—The reclaimed sand was conditioned at 25° C. with 0.12% by weight percent, based on the weight of sand, of an 8% solution in water of gamma-aminopropyl triethoxy silane.

Control Specimens 7C—The reclaimed sand was treated at 25° C. with 0.12% by weight, based on the weight of sand, of a 16% solution in water of gamma-aminopropyl triethoxy silane.

Control Specimens 7D—The reclaimed sand was treated at 25° C. with 0.12% by weight, based on the weight of sand, of a 40% gamma-aminopropyl triethoxy silane solution in water.

The sand used was a mixture of reclaimed sand obtained from foundry cores and molds that had been used in casting molten iron. The cured binder in the molds and cores from which this sand was obtained was ALPHASET 9000 potassium phenol-formaldehyde resin binder from Borden, Inc., described in Example 1. The resin was again cured with triacetin.

In reclaiming the sand, the used molds and cores were shaken within a vibratory mill (Vibramill from General Kinematics Corp., Barrington, IL.) to remove loose particulates and break up any lumps. The sand grains were treated mechanically in a Thermal/Mechanical unit from Eirch Machines, Maple, Ontario, Canada, at ambient temperature. The reclaimed sand had an AFS Grain Fineness of about 39.1. The L.O.I. of the reclaimed sand was about 0.450%.

To produce the specimens, from 1500–2500 grams of sand for each control specimen were added to a Hobart Kitchen Aid mixer. This sand was brought to a temperature of about 25° C., the silane solution was added, and the combination mixed for about one minute. 1.5% by weight of an aqueous solution of ALPHASET 9000 potassium alkali condensed phenol-formaldehyde resin (described above, containing gamma-aminopropyl triethoxy silane in an amount of about 0.4% by weight, based on the weight of binder solution) was then added to the sand.

The resin and sand were mixed for 1 minute, after which time 25% by weight of triacetin, based on the weight of the resin solution, was added to the mixer and mixed for about another 40 seconds.

After mixing, the sand was used immediately to form Standard American Foundrymen Society's 1-inch dogbone tensile briquettes in a Dietert 696 corebox. The dogbones cured at room temperature and were broken at the following time intervals after the mix was made: 1 hour, 2 hours, 4 hours and 24 hours.

Tensile strength measurements were made as in Example 1. The tensile strengths of 3–4 cores were determined for each test specimen and each control specimen at the intervals indicated above. The average values observed for each specimen set were the calculated. The average values are reported in Table 7 with the percentage improvement in tensile strengths also indicated.

TABLE 7

| Test | Total Silane Solution % Used Based on Sand Wt. Water (wt %) | Silane Concentration Wt. % | Tensiles (psi) Hrs: 1 | 2 | 4 | 24 | % Improvement In Tensile Strength Hrs: 1 | 2 | 4 | 24 |
| --- | --- | --- | --- | --- | --- | --- | --- | --- | --- | --- |
| Control 7A | — | — | 23 | 33 | 35 | 35 | — | — | — | — |
| Control 7B | 0.12 | 8 | 42 | 50 | 53 | 53 | 82.6 | 51.5 | 51.4 | 51.4 |
| Control 7C | 0.12 | 16 | 41 | 58 | 63 | 60 | 78.2 | 75.7 | 80.0 | 71.4 |
| Control 7D | 0.12 | 40 | 42 | 58 | 68 | 70 | 82.6 | 75.7 | 94.0 | 100.0 |

The data in Table 7 illustrate the progressive improvements in tensile strength that are achieved by pretreating (conditioning) the sand with a silane solution. The effectiveness and economy in diluting the silane with water is also shown in that the initial tensile strengths of Control 7B and Control 7D specimens are equivalent, although the makeup of the Control 7D specimens utilized five times more silane than did the Control 7B specimens. Control 7C specimens exhibited comparable tensile strengths to those of Control 7D specimens after longer cure times, although less silane wa utilized.

EXAMPLES 8-10

Examples 8, 9 and 10 illustrate the effectiveness of the invention in improving the tensile strengths of test specimens produced by using reclaimed sand which is conditioned by a silane-amine solution.

The following sand test data consist of direct comparisons between (a) the use of a conditioning solution containing a mixture of an amine, i.e., diethylene triamine or higher molecular weight amine, and a silane; and (b) a silane solution; where different proportions of reclaimed sand and of pristine sand are present in the sand that is used.

The test specimens were made by (1) premixing pristine sand and reclaimed sand in a Hobart Kitchen Aid Mixer; (2) adding the conditioning solution and mixing for two minutes; (3) adding an alkaline phenol formaldehyde resin solution and mixing an additional two minutes.

EXAMPLE 8

In this Example, test dogbones were produced by first mixing a silane solution with 100% reclaimed Thomas Foundry sand at 35° C. The sand used in this Example was obtained from foundry molds and cores that had been used in casting steel. The resin binder solution utilized in forming these molds and cores comprised an ALPHASET 9010 potassium alkali phenol formaldehyde binder solution. This resin binder solution had a Brookfield viscosity in the range of 100-150 cps at a solids content of about 55%. The phenol:formaldehyde molar ratio for the resin was 1:1.8. The KOH:phenol molar ratio for the resin was 0.85:1.0. It was cured with a mixture of butyrolactone, triacetin and DBE-9 dibasic ester (DBE-9 dibasic ester is available from Dixie Chemical Co.).

The reclaimed sand was added to a Hobart Kitchen Aid Mixer, brought to 35° C. and mixed with the conditioning solution for about two minutes. About 1.5% by weight of an aqueous solution of ALpHASET 9010 resin was then added to the sand. This resin binder solution, as described in Example 1, included 0.4% by weight of gamma-aminopropyl triethoxy silane.

Control specimens 8A were prepared by mixing the reclaimed sand with A/B Max 500 silane solution, consisting of 25% by weight of AMEO-40 silane solution and 75% by weight of water AMEO-40 is, again, an aqueous solution containing 40% 3-aminopropyl triethoxysilane polymer.

Test specimens 8A were prepared by mixing the reclaimed sand with a DETA Mix 3 conditioning solution, which contained a mixture of 91.7 parts water, 5 parts of diethylene triamine, and 3.3 parts of A1100 gamma-aminopropyl triethoxy silane.

To make these specimens, the resin and sand were mixed for about 1 minute, then about 25% by weight of a curing agent mixture, based on the weight of the resin solution, was added to the mixer and mixed for about another 40 seconds. The curing agent mixture contained about 67% by weight DBE-9 dibasic ester and about 33% by weight of triacetin.

After mixing, the sand was used immediately to form dogbone tensile briquettes as described in Example 1. The specimens were permitted to cure at room temperature, and then were broken at the following time intervals after mixing: 2 hours, 4 hours, and 24 hours.

Tensile strength measurements were made as above on specimens for each set of values. The average values are reported in Table 8.

TABLE 8

Tensile Strengths (psi) of Control Specimens 8A and Test Specimens 8A at Different Time Intervals; 100% Reclaimed Sand

| | 2 hr. | 4 hr. | 24 hr. |
| --- | --- | --- | --- |
| Control Specimens 8A (Silane only) | 18 | 33 | 51 |
| Test Specimens 8A (Silane-amine Conditioning) | 12 | 22 | 34 |

Although the tensile strength measurements for the test specimens were, with this particular composition, actually lower than for the control specimens, it is noted that the concentration of silane used was actually considerably lower in the case of the test specimens (3.3%) relative to the control specimens (10%). It can thus be said that a marginal advantage in this case is that less of the more expensive constituent (the silane) may be used.

EXAMPLE 9

In this Example, test dogbones were produced by mixing a conditioning solution with a mixture of 70% reclaimed W.K.M. Foundry sand and 30% pristine sand at 25° C.

The sand used in this example was mechanically reclaimed from foundry molds and cores that had been used in casting steel. The binder solution utilized in forming these molds and cores was an ALpHASET 9015 potassium alkali phenol formaldehyde binder solution having a Brookfield viscosity of approximately 115 cps at a solids content of approximately 50% by weight. This binder solution included gamma-aminopropyl triethoxy silane, and it was cured with a mixture of butyrolactone, triacetin and DBE-9 dibasic ester (DBE-9 available from Dixie Chemical Co.).

The reclaimed sand was added to a Hobart Kitchen Aid Mixer, brought to 25° C. and mixed with the conditioning solution for about two minutes. About 1.5% by weight based on the sand, of an aqueous solution of ALpHASET 9010 potassium condensed phenol formaldehyde resin (described in Example 8) was then added to the sand.

Control specimens 9A were prepared by mixing the reclaimed sand with the A/B Max 500 solution of 3-aminopropyl triethoxysilane polymer.

Test specimens 9A were prepared by mixing the reclaimed sand with the DETA mix 3 conditioning solution mixture of 3.3% silane and 5% diethylene triamine in 91.7% water.

The resin and sand were mixed for about 1 minute after which time about 25% by weight, based on the weight of the resin solution of a triacetin mixture, was added to the mixer and mixed for about another 40 seconds. The triacetin mixture contained 70% by weight triacetin and 30% by weight gamma butyrolactone.

After mixing, the sand was used immediately to form Standard American Foundrymen Society's 1-inch dogbone tensile briquettes as described above. The dogbones cured at room temperature and were broken at the following time intervals: 2 hours, 4 hours and 24 hours, after the mix was made.

Tensile strength measurements were made as in Example The tensile strengths of 3-4 dogbone specimens obtained for each test specimen and each control specimen were measured at the intervals indicated above and averaged. The average values are reported in Table 9.

TABLE 9

| Tensile Strengths (psi) of Control Specimens 9A and Test Specimens 9A at Different Time Intervals | | | |
|---|---|---|---|
| Additive | 2 hr. | 4 hr. | 24 hr. |
| Control Specimens 9A | 35 | 44 | 62 |
| Test Specimens 9A | 35 | 41 | 68 |

In this Example, comparable tensile strength measurements are observed for the test specimens and the control specimens, even though the test specimens were prepared using a substantially lower concentration of silane.

EXAMPLE 10

In this Example, dogbone specimens were produced by mixing a silane solution, as is and with added amine, with 100% R. Hunt Foundry reclaimed sand at 25° C.

The sand used in this example was obtained from foundry molds and cores that had been used in casting iron. The binder solution utilized in forming these molds and cores was an ALPHASET 9015 potassium phenol formaldehyde binder solution, as described in Example 9, cured with a mixture of butyrolactone, triacetin and DBE-9 dibasic ester (from Dixie Chemical Co.).

The reclaimed sand was divided into portions. Each portion was added to a Hobart Kitchen Aid Mixer, brought to 25° C. and mixed with the silane solution, either (a) A/B Max silane solution or (b) DETA mix 3 silane plus amine as in Example 9) for control specimens 10A and for test specimens 10A, respectively, for about two minutes each. Once the conditioning solution was mixed with the sand, 1.5% by weight of an aqueous solution of ALPHASET 9010 potassium condensed phenol formaldehyde resin was added, as described in Example 8.

Control specimens 10A were prepared by mixing the reclaimed sand with 0.2% by weight of the A/B Max 500 conditioner based on sand weight.

Test specimens 10A were prepared by mixing the reclaimed sand with 0.2% of the DETA mix 3 strength additive, which again contains a mixture of 91.7% water, 5% diethylene triamine and 3.3% of the gamma aminopropyl silane.

The resin and sand were mixed for 1 minute, then 25% by weight, based on the weight of the resin solution, of a curing agent mixture was added to the mixer and mixed for about another 40 seconds. The curing agent mixture contained 70% by weight triacetin and 30% by weight gamma butyrolactone.

After mixing, the sand was used immediately to form Standard American Foundrymen Society's 1-inch dogbone tensile briquettes, as previously described. The dogbones were cured at room temperature and were broken at 2 hours, 4 hours, and 24 hours after the mix was made.

The tensile strengths of 3-4 of each set of dogbones were measured at the intervals indicated above and averaged. The average values are reported in Table 10.

TABLE 10

| Tensile Strengths (psi) of Control Specimens 10A and Test Specimens 10A at Different Time Intervals | | | |
|---|---|---|---|
| | 2 hr. | 4 hr. | 24 hr. |
| Control Specimens 10A | 13 | 15 | 23 |
| Test Specimens 10A | 12 | 15 | 25 |

Examples 8, 9 and 10 show that the tensile strength of articles made with reclaimed sands, that have been treated with conditioning solutions containing a mixture of a silane and amine in water are comparable in the tensile strengths to those made with the same reclaimed sand that has been a silane only-conditioning solution. This is true even though the amount of silane needed in the conditioning solution also containing an amine is significantly less than the amount of silane needed in a silane-only conditioning solution.

EXAMPLE 11

Use of Conditioning Solution Comprising Varying Concentrations of Amine

Example 11 shows the effectiveness of a silane-amine conditioning solution in improving the tensile strengths of specimens obtained by using reclaimed sand conditioned therewith. Tensile strength improvements are observed at a variety of amine concentrations, relative to a composition containing no silane or amine.

In each case below, a mixture of 80% sand reclaimed from molds and cores used for casting iron and 20% pristine sand was used. The reclaimed sand had previously been bonded with BETASET 9512 potassium phenol formaldehyde binder solution, and mechanically reclaimed, as described in Example 3.

Dogbones were prepared in this Example by (1) premixing 80 parts of the reclaimed sand and 20 parts new sand in a mixer; (2) adding the various conditioning solutions (described below) containing amine, silane and water, in a total amount of 0.3 parts, based on 100 parts of sand; (3) mixing for two minutes; (4) adding 1.5 parts of BETASET 9512 resin solution described in Example 3; and (5) mixing an additional two minutes.

Control specimens 11A were prepared in the absence of conditioning solution.

Test specimens 11A were prepared using a conditioning solution comprising 0.75% by weight of diethylene triamine (DETA); 3.30% by weight of A1100 aminopropyl triethoxysilane from Union Carbide; and 95.95% of water.

Test specimens 11B were preparing using a conditioning solution of 2.25% DETA; 3.30% of the same silane; and 94.45% of water.

Test specimens 11C were prepared using a conditioning solution comprising 4.5% of the amine; 3.30% of the silane; and 92.2% of water.

Test specimens 11D were preparing using a conditioning solution of 12.0% of the amine; 3.30% of the silane; and 84.7% of water.

After mixing, the sand was blown into cores and gassed as above, and the tensile strengths were measured using a Detroit Testing Machine, Model CST, as described above. Measurements of tensile strength were again made for this group of specimens and the average values at different time intervals determined. The average tensile strength values are given in Table 11 below.

TABLE 11

Tensile Strengths (psi) of Control Specimens 11A and Test Specimens 11A, 11B, 11C and 11D at Different Time Intervals From Cure

|  | 1 Min | 30 Min | 60 Min | 24 Hours |
| --- | --- | --- | --- | --- |
| Control Specimens 11A | 53 | 59 | — | 74 |
| Test Specimens 11A | 78 | 94 | 92 | 124 |
| Test Specimens 11B | 87 | 99 | 95 | 130 |
| Test Specimens 11C | 90 | 90 | 101 | 117 |
| Test Specimens 11D | 75 | 93 | 87 | 104 |

This Example shows improved tensile strengths obtained by preparing specimens from reclaimed sand treated with a conditioning solution containing a silane and varying amounts of amine, relative to untreated sand.

EXAMPLE 12

Use of Conditioning Solutions Comprising Varying Concentrations of Silane

Example 12 shows the effectiveness of a silane-amine conditioning solution, at a variety of silane concentrations, in improving the tensile strengths of specimens obtained using reclaimed sand conditioned therewith.

The process of Example 11 was virtually duplicated except that, instead of varying the amine concentration, the amine concentration was held constant and the silane concentration was varied.

Control specimens 12A were prepared in the absence of conditioning solution.

Test specimens 12A were prepared using a conditioning solution comprising 3.0% by weight of diethylene triamine (DETA); 0.75% by weight of A1100 aminopropyl triethoxysilane; and 96.25% by weight of water.

Test specimens 12B were prepared using a conditioning solution of 3.0% of DETA; 2.25% of the same silane; and 94.75% of water.

Test specimens 12C were prepared using a conditioning solution comprising 3.0% of DETA; 4.5% of the silane; and 92.5% of water.

Test specimens 12D were prepared using a conditioning solution comprising 3.0% of the amine; 12.0% of the silane; and 85.0% of water.

The specimens were mixed, blown and gassed as above, and average tensile strengths were determined in the same manner. Average tensile strengths are given in Table 12 below.

TABLE 12

Tensile Strengths (psi) of Control Specimens 12A and Test Specimens 12A, 12B, 12C and 12D at Different Time Intervals From Cure

|  | 1 min | 30 min | 24 hr |
| --- | --- | --- | --- |
| Control specimens 12A | 45 | 44 | 54 |
| Test specimens 12A | 75 | 89 | 105 |
| Test specimens 12B | 78 | 93 | 101 |
| Test specimens 12C | 85 | 93 | 102 |
| Test specimens 12B | 88 | 99 | 108 |

CONCLUSION

While this invention has been disclosed in this patent application by reference to the details of preferred embodiments of the invention, it is to be understood that this disclosure is intended in an illustrative rather than in a limiting sense, as it is contemplated that modifications will readily occur to those skilled in the art within the spirit of the invention and the scope of the appended claims.

What is claimed is:

1. A method for treating free-flowing granular foundry sand to improve the tensile strength of a resin-bonded shape produced therefrom with an ester curable alkaline phenolic resin binder over the tensile strength that would otherwise be achieved if said granular foundry sand were untreated, at least a portion of said sand having been reclaimed after having previously been formed into a resin-bonded shape with an alkaline resin binder, then separated from said shape into free-flowing granules, said method comprising placing said free-flowing granular foundry sand in contact with a sufficient quantity of a solution comprising aqueous solvent, silane, and amine, wherein the amounts of silane, amine, and solvent, respectively, are chosen to be effective to improve the tensile strength of a resin-bonded shape produced from free-flowing granular foundry sand to which said solution has been applied, wherein said silane comprises compounds conforming the formula $R'Si(OR)_3$, wherein $R'$ is a $C_2$–$C_6$ alkylene group bonded to an amino, epoxy, mercapto, glycidoxy, ureido, hydroxy, hydroxy-$C_1$–$C_6$ alkylamino, amino-$C_1$–$C_6$ alkylamino, $C_2$–$C_6$ alkenyl, or $C_2$–$C_6$ alkenyl-carboxy group, and the "R" groups may be the same or different and are selected from $C_1$–$C_6$ alkyl and $C_1$–$C_6$ alkoxy-substituted $C_1$–$C_6$ alkyl groups, wherein said silane is a separate compound from said amine, and wherein said amine has a boiling point of about 115° C. or more.

2. A method according to claim 1 wherein said free-flowing granular foundry sand is placed in contact with said solution in an amount about 0.02% to about 1.0% by weight of said solution based on weight of the sand and wherein the concentration of amine in said solution is in the range from about 0.1% by weight to less than about 30% by weight, based on the weight of said solution, and wherein the concentration of said silane in said solution is in the range from about 0.1% by weight to about 40% by weight based on the weight of said solution.

3. A method according to claim 1 wherein the surfaces of said free-flowing granular foundry sand have thereon residual material from previous bonding with a binder of an ester-cured alkaline phenolic resin.

4. A method according to claim 2 wherein the surfaces of said free-flowing granular foundry sand have thereon a residue from previous bonding with a binder of an ester-cured alkaline phenolic resin.

5. A method according to claim 2 wherein said solution contacting step comprises
applying said solution to said granules at a silane concentration of between about 0.5% by weight and about 40% by weight based on said solution, and at an amine concentration of between about 0.5% by weight and about 30% by weight based on the weight of said solution.

6. A method according to claim 2 wherein said solution contacting step comprises
applying said solution to said granules at a silane concentration of between about 1% and about 10% by weight based on weight of said solution, and at an amine concentration of between about 1% by weight and about 10% by weight based on weight of said solution.

7. A method as in claim 1 wherein said amine is selected from the group consisting of ethylene diamine, diethylene triamine, triethylene tetraamine, tetraethylene pentamine and mixtures thereof.

8. A method as in claim 2 wherein said amine is diethylene triamine.

9. A method as in claim 5 wherein said amine utilized is an organic amine that is soluble in water.

10. A method as in claim 6 wherein said amine is a water soluble amine.

11. A method as in claim 5 wherein the silane used is an amino silane conforming to the general formula

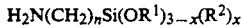

$H_2N(CH_2)_nSi(OR^1)_{3-x}(R^2)_x$ wherein n equals a whole number of from 2 to 4, $R^1$ is an alkyl group of from 1 to 4 carbon atoms, $R^2$ is an alkyl group of from 1 to 4 carbon atoms or phenyl and x is 0 or 1.

12. A method according to claim 1 wherein, prior to contact with said solution, said granules of reclaimed sand are formed into a mixture with pristine sand, the amount of said pristine sand being within the range of from about 1% to about 80% by weight of the total weight of the mixture of pristine sand and said granules.

13. A method for treating a mixture of grains of pristine sand and free-flowing granular reclaimed foundry sand to improve the tensile strength of ester-cured alkaline phenolic resin-bonded shapes produced therefrom over the tensile strength that would otherwise be achieved if said sand mixture were untreated, said reclaimed sand having been previously formed into a resin-bonded shape with an ester-cured alkaline phenolic resin binder, then separated from said shape into free-flowing sand granules having residual material on their surfaces from said previous bonding with said alkaline resin, said method comprising
mixing said reclaimed sand with pristine sand, the amount of said pristine sand being within the range of from about 1% to about 80% by weight based on the total weight of said mixture of pristine sand and said reclaimed sand, then placing said sand mixture in contact with a sufficient quantity of a solution comprising an aqueous solvent, silane, and amine, wherein the amounts of amine, silane, and solvent, respectively, are chosen to be effective to improve the tensile strength of a resin-bonded shape produced from said mixture, wherein said silane comprises compounds conforming the formula $R'Si(OR)_3$, wherein $R'$ is a $C_2$-$C_6$ alkylene group bonded to an amino, epoxy, mercapto, glycidoxy, ureido, hydroxy, hydroxy-$C_1$-$C_6$ alkylamino, amino-$C_1$-$C_6$ alkylamino, $C_2$-$C_6$ alkenyl, or $C_2$-$C_6$ alkenyl-carboxy group, and the "R" groups may be the same or different and are selected from $C_1$-$C_6$ alkyl and $C_1$-$C_6$ alkoxy-substituted $C_1$-$C_6$ alkyl groups, wherein said silane is a separate compound from said amine, and wherein said amine has a boiling point of about 115° C. or more.

14. A method in accordance with claim 13 wherein said sand mixture comprises from about 10% to about 50% by weight pristine sand.

15. A method according to claim 13 comprising placing said sand mixture in contact with said solution by applying to said sand mixture a solution having an amine concentration of less than 30% by weight based on said solution, using an amount of said solution of from 0.02% to 1.0% by weight based on the weight of said mixture.

16. A method according to claim 13 wherein said sand mixture is placed in contact with said solution by applying to said sand mixture a conditioning solution having a silane concentration of less than about 40% by weight based on said solution, and using an amount of said solution of from 0.02% to 1.0% by weight based on said mixture.

17. A method in accordance with claim 16 wherein said mixture is placed in contact with said solution by applying to said mixture a solution having a silane concentration of less than 10% by weight based on said solution.

18. A method according to claim 13 wherein said reclaimed sand is characterized by the presence on its surfaces of residual material from previous use in which it was bonded with an alkaline resin binder comprising a potassium phenolic resin.

19. A method according to claim 18 wherein said residual material originated from previous bonding with a binder comprising an ester-cured potassium phenolic resin.

20. A method for conditioning a mixture of grains of pristine sand and of free-flowing reclaimed granular foundry sand, to improve the tensile strength of a shaped article made from said sand mixture and an ester-cured alkaline phenolic resin binder, as compared to the tensile strength that would otherwise be achieved if said sand mixture were untreated, said reclaimed sand having been previously formed into a reins-bonded shape using a binder comprising an ester-curable alkaline phenolic resin binder that had been ester-cured after forming said shape, then separated from said shape in the form of free-flowing sand having surface residues, said method comprising mixing said reclaimed sand with pristine sand, the amount of said pristine sand being within the range of from about 1% to about 80% by weight based on the total weight of said mixture of pristine sand and said reclaimed sand, then bringing said sand mixture into contact with a conditioning solution comprising an aqueous solvent, silane, and amine, the amount of said conditioning solution being from 0.1% to 0.5% by weight of said solution based on the weight of the sane, the concentration of said amine being not above about 30% by weight of said solution, the amounts of amine and of silane being sufficient to improve the tensile strength of ester-cured alkaline phenolic resin bonded shapes produced therefrom as compared to the tensile strength that would be achieved if the sand mixture were unconditioned.

wherein said silane comprises compounds conforming the formula $R'Si(OR)_3$, wherein $R'$ is a $C_2$-$C_6$ alkylene group bonded to an amino, epoxy, mercapto, glycidoxy, ureido, hydroxy, hydroxy-$C_1$-$C_6$ alkylamino, amino-$C_1$-$C_6$ alkylamino, $C_2$-$C_6$ alkenyl, or $C_2$-$C_6$ alkenyl-carboxy group, and the "R" groups may be the same or different and are selected from $C_1$-$C_6$ alkyl and $C_1$-$C_6$ alkoxy-substituted $C_1$-$C_6$ alkyl groups, wherein said silane is a separate compound from said amine, and wherein said amine has a boiling point of about 115° C. or more.

21. The method of claim 20 wherein said silane is an aminosilane.

22. A composition comprising free-flowing sand having applied thereto an amount of an aqueous solution comprising aqueous solvent, silane, and amine, wherein the amount of said solution and the concentrations of said maine, silane, and solvent, respectively, are chosen to be effective to improve the tensile strength of a resin-bonded shape produced from said sand and an ester-cured alkaline phenolic resin binder relative to the tensile strength that would otherwise be achieved if said sand were untreated, wherein said silane comprises compounds conforming the formula $R'Si(OR)_3$, wherein $R'$ is a $C_2$-$C_6$ alkylene group bonded to an amino, epoxy, mercapto, glycidoxy, ureido, hydroxy, hydroxy-$C_1$-$C_6$ alkylamino, amino-$C_1$-$C_6$ alkylamino, $C_2$-$C_6$ alkenyl, or $C_2$-$C_6$ alkenyl-carboxy group, and the "R" groups may be the same or different and are selected from $C_1$-$C_6$ alkyl and $C_1$-$C_6$ alkoxy-substituted $C_1$-$C_6$ alkyl groups, wherein said silane is a separate compound from said amine, and wherein said amine has a boiling point of about 115° C. or more.

23. A composition in accordance with claim 22, said free-flowing sand having applied thereto from about 0.02% to about 1.0% by weight of said solution based on the weight of said sand.

24. A composition according to claim 23 wherein at least a portion of said free-flowing sand had been previously formed into a resin bonded shaped with an ester-cured alkaline phenolic resin binder, then reclaimed from said shape as free-flowing granules suitable for reuse.

25. A composition according to claim 24 wherein the silane used comprises an amino silane conforming to the general formula $$H_2N(CH_2)_nSi(OR^1)_{3-x}(R^2)_x$$

wherein n equals a whole number from 2 to 5, $R^1$ is an alkyl group of from 1 to 4 carbon atoms, $R^2$ is an alkyl group of from 1 to 4 carbon atoms or phenyl, and x is 0 or 1.

26. Conditioned sand for use in a foundry with an ester-curable phenolic resin binder, comprising:
1) sand comprising free flowing granular reclaimed foundry sand having residual surface material from previous bonding with an ester-cured alkaline phenolic resin binder, said sand having an American Foundrymen Society 25 to 140 Grain Fineness, wherein the binder in the foundry articles from which said reclaimed sand was obtained was an ester-cured alkaline phenolic resin;
2) a conditioning solution applied to said sand to condition it and comprising solvent, silane and amine, wherein the solvent in said solution is selected from the group consisting of: water; and an aqueous solution of a water-compatible organic solvent or an alcohol of from 1 to 6 carbon atoms, and said solution is effective in enhancing the tensile strength of foundry cores and molds produced with said sand after said sand has been conditioned by contact with said solution, wherein the quantity of said solution falls within the range of about 0.02% to 1.0% by weight based on weight of said sand, wherein the amounts of amine, silane and solvent, respectively, in said solution are chosen to be effective to improve the tensile strength of an ester-cured, alkaline phenolic resin bonded shape made from said conditioned sand as compared to the tensile strength that would be achieved if said sand were not conditioned, wherein said silane comprises compounds conforming the formula $R'Si(OR)_3$, wherein $R'$ is a $C_2$-$C_6$ alkylene group bonded to an amino, epoxy, mercapto, glycidoxy, ureido, hydroxy, hydroxy-$C_1$-$C_6$ alkylamino, amino-$C_1$-$C_6$ alkylamino, $C_2$-$C_6$ alkenyl, or $C_2$-$C_6$ alkenyl-carboxy group, and the "R" groups may be the same or different and are selected from $C_1$-$C_6$ alkyl and $C_1$-$C_6$ alkoxy-substituted $C_1$-$C_6$ alkyl groups, wherein said silane is a separate compound from said amine, and wherein said amine has a boiling point of about 115° C. or more.

27. A composition as in claim 26 wherein the silane used is an aminosilane conforming to the general formula $$N_2H(CH_2)_n-Si(OR^1)_{3-x}(R^2)_x$$

wherein n equals a whole number from 2 to 5, $R^1$ is an alkyl group of from 1 to 4 carbon atoms, $R^2$ is an alkyl group of from 1 to 4 carbon atoms, and x is 0 or 1.

28. A method for conditioning free-flowing granular foundry sand to improve the tensile strength of a cured resin-bonded shape produced therefrom over the tensile strength that would otherwise be achieved if said granular foundry sand were not so conditioned, at least a portion of said sand having been previously formed into a resin bonded shape with an ester-cured alkaline phenolic resin binder, then separated from said shape into free-flowing reclaimed said granules, said method comprising placing said sand in contact with a solution comprising aqueous solvent and an amine, and placing said sand in contact with a silane-containing solution, said silane and said amine being present in sufficient quantities, respectively, to improve the tensile strength of an article made from the thus-conditioned sand with an ester-curable alkaline phenolic resin binder, as compared to an article similarly made but with sand not so conditioned, wherein said silane comprises compounds conforming the formula $R'Si(OR)_3$, wherein $R'$ is a $C_2$–$C_6$ alkylene group bonded to an amino, epoxy, mercapto, glycidoxy, ureido, hydroxy, hydroxy-$C_1$–$C_6$ alkylamino, amino-$C_1$–$C_6$ alkylamino, $C_2$–$C_6$ alkenyl, or $C_2$–$C_6$ alkenyl-carboxy group, and the "R" groups may be the same or different and are selected from $C_1$–$C_6$ alkyl and $C_1$–$C_6$ alkoxy-substituted $C_1$–$C_6$ alkyl groups, wherein said silane is a separate compound from said amine, and wherein said amine has a boiling point of about 115° C. or more.

29. A method according to claim 28 wherein said amine is present in its solution in a concentration of about 0.5% to about 30% by weight based on the weight of said solution.

30. A method according to claim 28 wherein said amine is selected from the group consisting of ethylene diamine, diethylene triamine, triethylene tetraamine, tetraethylene pentaamine, and mixtures thereof.

31. A method according to claim 28 wherein said amine is diethylene triamine.

32. A conditioning solution for application to reclaimed foundry sand to improve the tensile strength of a resin-bonded shape produced therefrom with an ester curable alkaline phenolic resin binder, as compared to the tensile strength that would otherwise be achieved if said sand were untreated, said conditioning solution comprising an aqueous solvent, silane, and amine, said silane and said amine being present in concentrations effective to improve the tensile strength of a resin bonded shape produced from said conditioned sand using an ester-curable alkaline phenolic resin binder, when said sand is treated by application thereto of from 0.1% to 0.5% by weight of said solution based on the weight of said sand, wherein said silane comprises compounds conforming the formula $R'Si(OR)_3$, wherein $R'$ is a $C_2$–$C_6$ alkylene group bonded to an amino, epoxy, mercapto, glycidoxy, ureido, hydroxy, hydroxy-$C_1$–$C_6$ alkylamino, amino-$C_1$–$C_6$ alkylamino, $C_2$–$C_6$ alkenyl, or $C_2$–$C_6$ alkenyl-carboxy group, and the "R" groups may be the same or different and are selected from $C_1$–$C_6$ alkyl and $C_1$–$C_6$ alkoxy-substituted $C_1$–$C_6$ alkyl groups, wherein said silane is a separate compound from said amine, and wherein said amine has a boiling point of about 115° C. or more.

33. A conditioning solution according to claim 32 where in both said silane and said amine are at concentrations respectively in said solution in the range from about 0.5% to about 20% by weight of each, based on the weight of said solution.

34. A conditioning solution according to claim 33 wherein said silane and said amine are present in said solution in concentrations of each, respectively in the range of from about 1% to about 10% by weight and based on the weight on said solution.

35. A conditioning solution according to claim 34 wherein said silane is an aminosilane.

36. A conditioning solution according to claim 35 wherein said silane is selected from the group consisting of ethylene diamine, diethylene triamene, triethylene tetraamine and tetraethylene pentamine.

37. A conditioning solution according to claim 35 wherein said solvent comprises water and said amine and said silane are both water soluble.

38. Conditioned sand as in claim 26 wherein the silane solution comprises an aqueous solution of a silane selected from the group consisting of:
gamma-aminopropyl triethoxy silane;
gamma-aminopropyl trimethoxy silane;
gamma-aminobutyl triethoxy-silane;
gamma-aminopentyl triethoxy silane;
gamma-aminopropyl diethoxymethyl silane;
gamma-ureidopropyl triethoxy silane;
gamma-glycidoxypropyl triethoxy silane;
gamma-aminopropyl diethoxyethyl silane;
gamma-aminopropyl diethoxy phenyl silane;
delta-aminobutyl diethoxy phenyl silane;
delta-aminobutyl diethoxymethyl silane; and
delta-aminobutyl diethoxyethyl silane.

39. Conditioned sand according to claim 26 wherein said solvent is an aqueous solvent and said amine is a water soluble amine.

* * * * *